April 15, 1969  M. S. JOHNSTON  3,438,553
TAPPING DEVICE FOR BEER KEGS AND THE LIKE
Filed Jan. 4, 1967
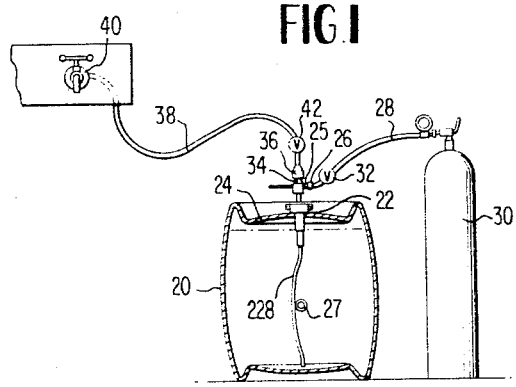
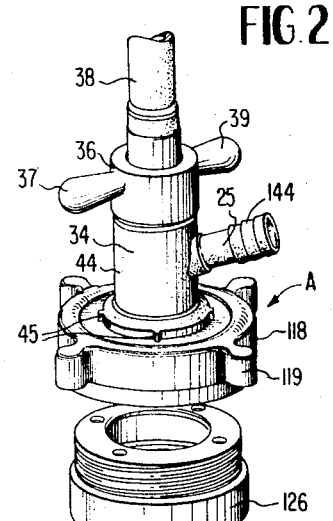
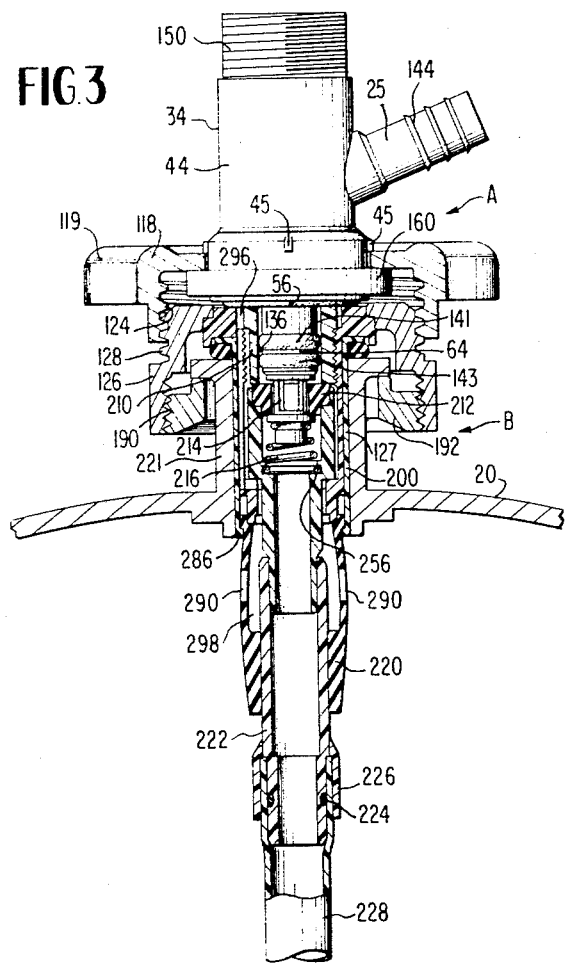
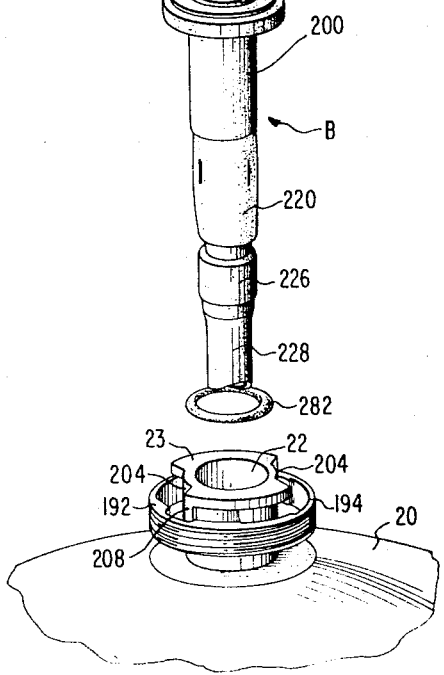
INVENTOR
MACK S. JOHNSTON
BY *Le Blanc & Shur*
ATTORNEYS April 15, 1969 M. S. JOHNSTON 3,438,553
TAPPING DEVICE FOR BEER KEGS AND THE LIKE
Filed Jan. 4, 1967 Sheet 2 of 2

INVENTOR
MACK S. JOHNSTON

BY *LeBlanc & Shur*

ATTORNEYS

3,438,553
TAPPING DEVICE FOR BEER KEGS AND THE LIKE

Mack S. Johnston, Rolling Hills, Calif., assignor to Johnston Enterprises, Inc., East Kalispell, Mont., a corporation of Montana
Continuation-in-part of application Ser. No. 587,627, Oct. 18, 1966, which is a continuation of application Ser. No. 406,682, Oct. 27, 1964, which in turn is a continuation-in-part of applications Ser. No. 150,982, Nov. 8, 1961, and Ser. No. 395,084, Sept. 8, 1964. This application Jan. 4, 1967, Ser. No. 607,297
Int. Cl. B65d 83/00
U.S. Cl. 222—400.7                                   10 Claims

ABSTRACT OF THE DISCLOSURE

Disclosed is a tapping device for drawing liquids, such as beer, from beer kegs or barrels, using gas to drive the fluid from the container. The device comprises an adapter, semi-permanently installed in the keg at the brewery, containing a normally closed beer valve and a gas check valve. A coupler, including a probe for opening the beer valve, is attached to the keg at a tavern or other dispensing establishment. The adapter is provided with enlarged beer and gas passages including a central beer passage, an intermediate member, and a surrounding solid sleeve. The beer passage communicates with a plastic "siphon" tube in the keg.

---

This application is a continuation-in-part of copending application Ser. No. 587,627 filed Oct. 18, 1966, which is in turn a continuation of application Ser. No. 406,682 filed Oct. 27, 1964, now abandoned; said application Ser. No. 406,682 is a continuation-in-part of my copending application Ser. No. 150,982 filed Nov. 8, 1961, and also of my likewise-entitled copending application Ser. No. 395,084 filed Sept. 8, 1964, as a continuation of my aforesaid application Ser. No. 150,982. Said application Ser. No. 150,982 was abandoned (after notice of allowance), in favor of said copending application Ser. No. 395,084, which issued as U.S. Patent No. 3,231,154 on Jan. 25, 1966.

This invention relates to a new and improved tapping device for drawing liquids such as beer from containers such as beer kegs or barrels, using a gas to drive the fluid from the container. In particular, the invention relates to a new improved tapping device usable with conventional beer kegs such as the so-called "peerless" and "golden gate" systems, and comprises a sub-unit called a "keg adapter" which constantly seals the keg, and another sub-unit called a "coupler" which it attached to the beer dispensing apparatus in a restaurant or tavern and is readily connected to the keg adapter so that the tapping device is automatically in operating condition.

Today, as in the past, the most widely prevailing practice in the beer industry is for a brewery to provide draft beer to retail outlets in "conventional" kegs which for the most commonly used "peerless" system have a ¾ inch opening in the top, closed with a bung in the form of a cork or plug. To dispense the beer from the keg, the bartender "taps" the keg by knocking in or pushing in the bung and inserting an elongated tap rod with an associated "siphon" device for drawing the beer from the keg, these being fastened to the keg by means of a "bayonet" or like connection. This siphon device includes means for injecting compressed air or $CO_2$ through the tap and siphon device from the keg, removes the siphon and also external valve means for respectively controlling the flow of gas into the keg and beer from the keg. A gas supply hose connects the siphon into a source of gas, and another hose connects it to the beer dispensing apparatus mounted on the counter or bar in the restaurant or tavern whereby beer may be dispensed from the keg. When the beer has been withdrawn from the keg to the extent feasible, the bartender then removes the tap and siphon device from the keg, removes the keg from the dispenser cabinet, installs a new keg and repeats the process of knocking in or pushing in the bung and installing the tap rod and related siphon equipment, etc. The same tap rod and siphon is used for every keg and must be washed and cleaned periodically to prevent fouling and contamination.

The term "siphon" is used herein to describe tapping devices such as the tapping devices of this invention, for kegs and like containers in accordance with conventional practice although the term is technically a misnomer in that such tapping devices do not utilize a siphon or the siphon principle in any way. When the term "siphon" is used herein, it is to be understood that it is used in accordance with accepted practice and refers to a tapping device for beer kegs and the like of the type disclosed and claimed.

The prevailing practice in tapping a beer keg which has been used for fifty years has a number of disadvantages for the brewery, the dispensing establishment, and the public. These are set forth in more detail in my copending application Ser. No. 587,627, filed Oct. 18, 1966, which application is incorporated herein by reference. Briefly they include the fact that the kegs often become filled with insects, small animals and debris of every sort, yeast and other solids from the beer inevitably accumulate with the result accumulation of destructive bacteria and further a substantial quantity of beer is often lost during the tapping process. Other disadvantages include the fact that conventional tapping systems require a certain amount of strength and may be dangerous to the bartender so that it is more difficult to tend bar, especially for a female.

In an attempt to eliminate some of these aforementioned problems, an alternative tapping device has been adopted by some utilizing a non-conventional keg which system is often referred to as the so-called "golden gate" system. Kegs for this system have an opening in the top with a fitting therein for receiving gas plus another opening in the side of the keg near the bottom with a fitting therein for dispensing the beer. This arrangement requires manufacture, installation, and a coupling of two fittings. Also, the barrel is usually tilted to dispense the beer to a maximum extent which makes handling more difficult and requires more space. Further, the nonconventional keg and its two fittings are not only more expensive but also introduce problems in high speed automatic cleaning and filling of kegs if the brewery is committed to the above described more conventional "peerless" kegs as is usually the case.

In my aforementioned copending application Ser. No. 587,627, filed Oct. 18, 1966, I have disclosed a new improved beer tapping device for dispensing beer or like liquids in kegs or barrels which overcomes the above-discussed and other problems and shortcomings of beer dispensing systems heretofore available and also provides a number of important advantages and improved results as hereinafter set forth. Particularly the invention of that application provides a new, improved means for packaging and dispensing beer and like liquids in kegs utilizing an adapter assembly installed in the sealing the keg at the brewery with an also improved coupler sub-assembly which is fastened to the keg adapter by the tavern keeper or bartender, thus, automatically breaking the seal and readying the keg for the dispensing of beer. Simple removal of the aforementioned coupler sub-assembly by the bartender causes the keg to automatically reseal, thereby positively preventing the entry of trash or other foreign objects. In addition, the beer is positively prevented from entering the gas passageway portion of the tapping device, thus preventing contamination or fouling of this portion of the device by dried beer residue normally accumulating due to the surging of the beer.

It is an object of the present invention to provide a further novel and improved beer tapping device and novel improved keg adapter and coupler sub-assemblies and components for the same, of the general type disclosed and claimed in my aforesaid application Ser. No. 587,627 so as to provide additional improvements in construction, mode of operation and result as below set forth.

It is another object of the present invention to provide a keg adapter having a compact and efficient gas check valve positioned within the beer keg and surrounding a lower tap rod extending from the keg adapter unit, with the upper end of the gas check valve communicating with improved enlarged gas passageways uniquely formed in a keg adapter unit to provide an enlarged beer passage and especially an enlarged gas passage adequate for flow of beer therethrough particularly when used in a "series" beer keg installation, without structurally weakening the keg adapter unit or enlarging the unit beyond the commercial size limitation imposed by the ¾ inch standard keg opening of a "peerless" system for both low and high pressure draft beer systems.

It is still another object of the present invention to provide an improved beer keg tapping device incorporating a keg adapter which includes an improved "Serria" type valve usable with plastic tap rods and especially those made of polyethylene, polycarbonate (sold under the trade name Lexan) and other like polymers.

Another object of the present invention is to provide an improved beer tapping device which can be used with any standard type of beer keg in common usage, and to provide adapter units for both the "peerless" and "golden gate" systems, even though the kegs typically vary considerably in configuration and size, according to source and time produced. The keg adapter unit of this invention is semi-permanently fastened in the beer keg, does not protrude from the end of the keg, and thus avoids damage by rough handling during transit to and from breweries.

A further object of the present invention is to provide a new and improved arrangement for packaging and dispensing beer or the like from a keg or like container, which achieves the above discussed objects and advantages. It can be made at a relatively low price with conventional machinery and with a minimum of tooling, whereby widespread use of the invention in its intended field is economically feasible.

Another object of the invention is to provide a modified keg adapter unit including an improved resilient gas check valve, positioned at the inner end of a much larger and modified gas passageway in the keg adapter unit, with the upper end of the check valve forming a seal and positively retained by the adapter against displacement and/or leakage.

These and further objects and advantages of the invention will be more apparent upon reference to the following specification, claims and appended drawings wherein:

FIGURE 1 is a schematic view showing the novel packaging and dispensing tapping device of the present invention as installed in a beer keg associated with a beer dispenser in a so-called "peerless" type system, in conjunction with a source of gas under pressure, the beer keg being broken away and shown in section for clarity;

FIGURE 2 is an exploded view showing various components of the tapping device of this disclosure including the sub-assembly coupler unit A and the sub-assembly adapter unit B in conjunction with a "peerless" type beer keg;

FIGURE 3 is a vertical cross section through the tapping device of FIGURES 1 and 2 showing the coupler A connected to the adapter B and positioned on a "peerless" type keg;

Figure 4:
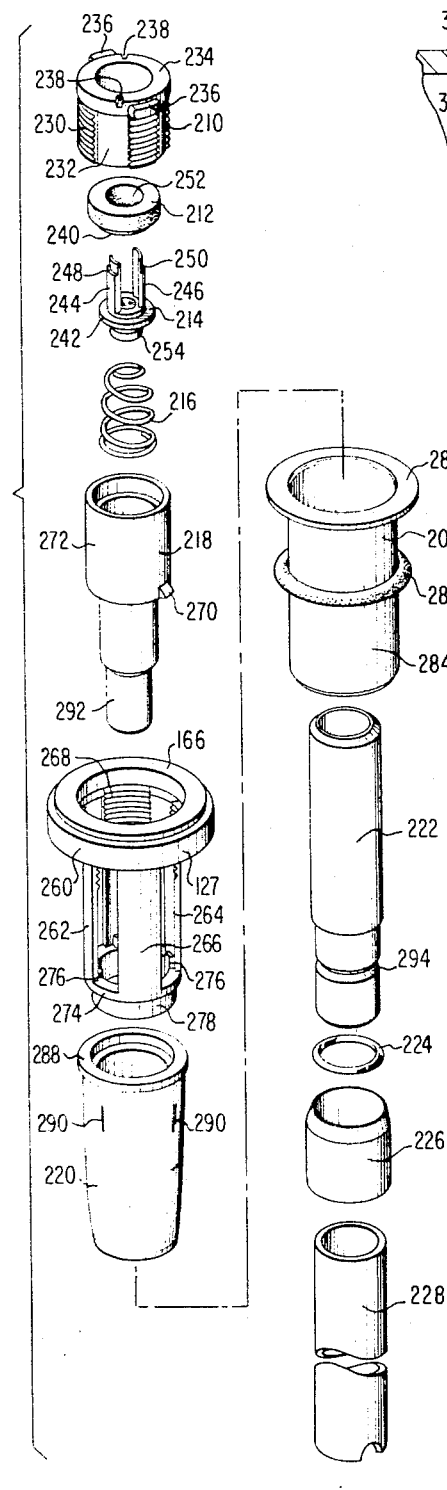
FIGURE 4 is an exploded view showing all the components making up the novel adapter unit B of the present invention usable in conjunction with a "peerless" type keg.

The beer or similar tapping device of the present invention is in many respects similar to that disclosed and claimed in my copending U.S. application Ser. No. 587,627, filed Oct. 18, 1966. Like parts bear like reference numerals. All the drawing and the entire specification of that application are incorporated herein by reference as though here fully set forth.

Referring to the instant drawings and especially to FIGURE 1, there is schematically shown a conventional beer keg 20 of the so-called "peerless" type having an opening 22 in its top wall 24 in which opening there is received the adapter unit B of the present invention, this unit being semi-permanently installed in the keg 20. A normally closed cleaning opening 27 is formed in the side wall of the keg. The coupler unit A of the present invention can be readily connected with the adapter unit B to form a tapping assembly as hereinafter amplified. The dispenser coupler unit A has a gas inlet port and fitting 25 adapted to receive a coupler 26 at the end of a gas supply tube 28 which communicates with a gas supply tank 30. If desired, a valve 32 of suitable conventional type may be controlled at the location of the keg 20. The dispenser coupler unit also has a beer exit fitting 34 which is adapted to receive a suitable conventional coupler 36 at the end of flexible tube 38 through which the beer is conducted to a conventional dispenser 40. If desired, a suitable valve 42 may be associated with the coupler 36 in a conventional manner for control of the beer flow at the keg 20. The arrangement of FIGURE 1 is shown merely for the purpose of illustrating usage of the present invention. Since the components thereof other than the units A and B are conventional and do not comprise a part of the present invention, further description thereof is believed unnecessary as dispensing arrangements for use with the new improved tapping device of this invention will be apparent to those skilled in the art in light of the disclosure herein.

Referring particularly to FIGURES 2-4, the new improved tapping device of this invention comprises two main units A and B herein generally called the "dispenser coupler" and "keg adapter" respectively. Dispenser coupler unit A is generally similar to that shown in my above-mentioned co-pending application Ser. No. 587,627 and particularly is similar to the unit illustrated in FIGURES 1, 3 and 3a of that application. It comprises a main cylindrical head portion 44 which is provided with an internal bore and carries a threaded collar 119 for fastening to the keg adapter unit B as explained below.

A tubular arm 144 having a central bore is preferably formed integral with the head 44 and is adapted to receive the end of a piece of tubing that connects the coupler unit A to the tank of pressurized gas or air such as the tank 30 shown in FIGURE 1. The coupler unit A also includes a generally tubular probe 64 (FIGURE 3) which is positioned within the bore 136 of the adapter. The central bore of the probe forms the sole liquid passageway through the coupler unit A and incoming gas passes through the coupler around the probe. The exterior of the probe is provided with grooves for the sealing rings 141 and 143 which may be "O-rings" of neoprene rubber. The sealing rings preclude the escape of gas in a manner more fully set forth in said co-pending application.

The cap 36 illustrated in FIGURE 2 is connected to the externally threaded portion 150 of head 44 and this cap 36 used with a suitable sealing ring holds the probe 64 within bore 136 in the coupler head 44 thereby when the units are coupled forcing the lower end of the probe 64 to project sufficiently below the bottom of the coupler head portion 44 so as to open the beer valve in the keg adapter unit B when the coupler unit A is conected thereto. Cap 36 has two handle portions 37 and 39 as its upper end and is adapted to be connected to the beer conduit 38 of conventional dispensing apparatus typically used in taverns, restaurants and the like, such as shown at 36, 38, 40 and 42 in FIGURE 1.

An annular member 160 is secured about the slightly enlarged lower end of the coupler head 44 by a snap ring and retains collar 118 rotatably mounted on the coupler head 44. The collar 118 has a plurality of handle portions 119 formed integrally therewith, is internally threaded as at 124 for cooperation with the threaded portion 128 of an annular ring 126 and fits loosely on the head thereby permitting relative rotation between the collar and head. Upward movement of the collar along the head may be limited if so desired by the projections 45 formed integral with the head 44. The bottom of the head carries an annular seal 56 which may be on "O-ring" of neoprene rubber for providing an annular seal between the coupler unit A and the upper surface 166 of a threaded and slotted T-section 127 (FIGURE 4) of adapter unit B, surrounding the beer and gas passages.

The coupler unit A except for the collar limiting projections 45, is substantially identical to the coupler unit illustrated in FIGURE 1 of application Ser. No. 587,627 (original FIGURE 9 of that application) and may be used interchangeably with that coupler unit.

While the keg adapter unit B of the present invention is somewhat similar to that illustrated in FIGURES 1–3 of the aforesaid copending application, the keg adapter unit B of the present invention has the unique slotted T-section 127 and cooperating sleeve 200 (FIGURE 4) in conjunction with other improved structural features to define a unique and much larger gas passageway through the unit permitting a large liquid passageway through the unit particularly important in avoiding wild or stale beer and in providing a system readily adapted for use in series connected systems where beer is drawn from several kegs at one time in a well known manner.

The keg adapter unit B is held in the standard opening 22 in a conventional beer keg 20 by means adapted to cooperate with the standard so-called "peerless" beer keg flange or collar 23 in a manner more clearly shown in FIGURES 6a–6e of application Ser. No. 587,627. This securing means includes the previously described ring 126 which has its lower end spaced slightly above the top of the keg 20 in FIGURE 3 and which is internally threaded at 190 to receive an externally threaded ring 192. The ring 192 includes a thin wall section 194 and upwardly projecting diametrically opposite tabs formed on its inner periphery. Also formed on the inner periphery of the wall sections 194 and space circumferentially from the tabs are inwardly extending diametrically opposed abutments. As seen in FIGURE 2, the standard "peerless" beer keg flange 23 has two diametrically opposite cutaway portions 204 and one end of each of these cutaway portions has a lower depending projection 208 formed integrally with the flange 23 and the short cylindrical wall 22' of the opening 22.

To utilize these securing means ring 192 is snapped over the flange 23 in a manner more fully described in application Ser. No. 587,627 so that it rests on top of the keg 20 with the tabs extending upwardly; and the ring 192 is aligned so that the projections 208 of the flange 23 fit between adjacent tabs and abutments on the ring. The keg adapter unit is checked to be sure that the adapter is properly positioned within the keg opening 22. The ring 126 is then placed over the upper end of the adapter and aligned with the flange 23. Thereafter, the ring 126 is threaded on ring 192 so that the ring 192 is drawn up within the lower inside portion of ring 126 until the upper ends of the tabs on ring 192 contact the underside of keg flange 23. Thus, when the rings 126 and 192 are assembled, they cooperate with the flange 23 to securely lock the keg adapter unit within the opening 22 to prevent any longitudinal or rotational movement of the adapter unit relative to the opening. Ring 192 may be inexpensively molded of plastic without sacrificing strength or ruggedness of the keg adapter B since the metal ring 126 completely protects plastic securing ring 192 as well as the adapter unit. By removing one of the lugs and abutments, ring 192 may be made of metal and still slipped over the "peerless" collar 23 to act in a similar manner.

Referring particularly to FIGURES 2–4, the keg adapter unit B of the present invention incorporates as an important element thereof, a slotted T-member 127 which cooperates with remaining structural elements of the adapter to provide an improved and much enlarged gas passageway through the tapping device of this invention. Referring particularly to FIGURE 4, in addition to the rings 126 and 192 of FIGURE 2, the keg adapter B includes a valve retainer insert 210, a chucking washer 212 forming a valve seat, a bifurcated stainless steel valve 214 and a valve spring 216.

The valve is supported in a center section 218 in turn received in the slotted and threaded T-section 127. T-section 127 is in turn enclosed in sleeve 200 and in conjunction with the sleeve retains the upper end of a one-way rubber check valve or Serria valve 220. Suitably attached to the lower end of center section 218 is a short plastic tube 222 which is attached by means of a rubber washer 224 and a plastic ferrule 226 to a polyethylene siphon tube 228.

Valve retainer insert 210 is preferably formed of a suitable plastic and for example, may be made of a polycarbonate sold under the trade name Lexan. It is formed with four rows of cooperating threads 230 equidistantly spaced about its periphery by four slots 232. These threads are adapted to be received in threaded engagement with the internal threads of T-section 127 in a manner more fully described below. The upper end of retainer insert 210 terminates in an outwardly extending integral flange 234 having diametrically opposed tabs 236 which limit the distance the insert can be threaded into the slotted T-section 127. Insert 210 is provided with a pair of notches 238 in flange 234 adapted to be engaged by a spanner wrench so that the insert may be threaded into the T-section. Chucking washer 212 abuts against the underside of insert 210 and has a reduced diameter lower annular portion 240, which abuts a flange 242 on the valve 214. Valve 214 has a bifurcated construction including a pair of upwardly extending arms 244 and 246 which are notched at their upper ends as at 248 and 250 to receive the lower end or nose of the hollow probe of the coupler unit A. Legs 244 and 246 pass through a central aperture 252 formed in chucking washer 212.

Valve spring 216 is a helical compression spring and has its upper end wrapped around and secured to reduced end 254 of valve 214. Center section 218 is formed with an internal shoulder 256 (FIGURE 3) upon which rests the lower end of spring 216.

T-section 127 is preferably molded from suitable plastic such as the Lexan described above and is provided with an upper surface 166 against which the adapter unit A seals as described above. Surface 166 is formed on a stepped flange 260 which flange receives the upper end of metallic ring 126 to help clamp the adapter unit in the aperture 22 of the beer keg 20. Extending downwardly from an integral stepped flange 260 is an annular body 262 having four equally spaced slots 264 opening into the hollow center of the body. The four spaced struts 266 left by the slots 264 have their upper portions internally threaded as at 268 in FIGURE 4 which threads mate with the cooperating threads 230 on insert 210 previously described. Center section 218 is provided with a single projection 270 adapted to be received in one of the slots 264 so as to retain center section 218 against rotation. The underside of enlarged portion 272 of center section 218 is spaced from the bottom ring 274 of T-section 126 by a plurality of upwardly extending short posts 276. Extending downwardly from and integral with bottom ring 274, is an annular portion 278 of reduced diameter adapted to be recived in the upper end of the Serria valve 220.

Sleeve 200 slips over the T-section 127 with its upper flange 280 abutting the underside of the step flange 260 on T-section 127. A neoprene O-ring gasket 282 slips over the body portion 284 of the sleeve and engages the underside of flange 280. The lower annular edge of sleeve 200 projects inwardly as at 286 (FIGURE 3) so that the upper annular thickened ring 288 of check valve 220 is clamped between the sleeve and the lower reduced diameter portion 278 of the T-section 127. Serria valve 220 may be made of either gum (surgical) rubber or if desired, may be made of silicone rubber. It is provided with one or more slits 290 which act as check valves permitting gas to exit from inside the valve into the beer within the beer keg but prevents beer from passing radially inwardly through the slits to the gas passageway.

Received with a press fit over the small lower end 292 of center section 218 is the upper end of a short plastic tube 222. Both of these elements are preferably made of Lexan and are welded together. Tube 222 is provided with a groove 294 which receives O-ring 224. The upper end of siphon tube 228 is slipped over the lower end of tube 22, and over the O-ring and then ferrule 226 is slid upwardly along tube 228 into the position illustrated in FIGURE 3. Again, the all plastic element (preferably Lexan) 222 and plastic ferrule 226 are preferably welded together about the upper end of the polyethylene tube 228.

In operation, when the collar 118 in FIGURE 3 of the adapter A is tightened onto the ring 126 the hollow tubular probe of the coupler projects downwardly into the notches 248 and 250 in valve arms 244 and 246 driving the valve downwardly away from the valve seat formed by the smaller and lower end portion 240 of the chucking washer. In this position, the valve moves downwardly against the return force of spring 216 and in the open position, beer is free to move upwardly from the inside of the keg through the lower end of the siphon tube 228 (preferably notched at the bottom to permit beer to enter) and upwardly through the siphon tube 228, tube 222 through the spring, and through the open valve, and on upwardly through the coupler and line 38 to the dispenser 40 of FIGURE 1. At the same time, gas, i.e., air or $CO_2$ is supplied from the tank 30 by way of line 28 in FIGURE 1 to the inlet coupling 144 and follows a path through the coupler more fully described in copending application Ser. No. 587,627, which is completely separate from the beer flow path through the coupler and in the opposite direction. Gas enters the adapter B in the annular space between the top of valve retainer insert 210 and the flange 260 of T-section 127 which is indicated by the reference numeral 296 in FIGURE 3. The gas passes downwardly between the insert and the head of the T-section into the grooves 264 which provide a much larger gas path for the incoming gases without at the same time limiting the large liquid passageway up through the middle of center section 218. The gas path is out the lower ends of the slots 264, past the posts 276 which space the shoulder of center section 218 from the lower ring 274 of the T-section and into the annular area 298 in FIGURE 3 within the Serria valve and surrounding the upper end of tube 222. From here the gas passes outwardly through the slits 290 into the interior of the keg to pressurize the beer in a well known manner.

The above described system is particularly suited for use in "peerless" dispensing systems wherein the aperture 22 is limited and is nominally about ¾ inch in diameter. It is an important feature of the present invention that the adapter system provides not only a large channel for the flow of beer upwardly and out of the keg but also provide an improved and enlarged gas passageway through the device in a restricted opening 22. The enlarged gas passageway is particularly important when kegs are connected in series and the beer is forced serially through a system of a plurality of kegs such that the gas passageway of some of the kegs may be required to do duty as a liquid passageway without causing excess foam or causing the beer to be "wild" or "flat."

In a second type of system previously described, wherein the exit aperture from the keg is much larger and provided in a re-entrant cavity, the novel tapping device of the present invention and particularly the keg adapter B may still be used without significant modification. That is, the tapping unit of the present invention is universal in that it may be used with the previously described "peerless" type construction or with the enlarged apertures provided in the so-called "golden gate" systems. A system of this latter type incorporating a keg adapter B constructed in accordance with the present invention is illustrated in FIGURES 5 and 6 wherein like parts bear like reference numerals.

Figure 5:
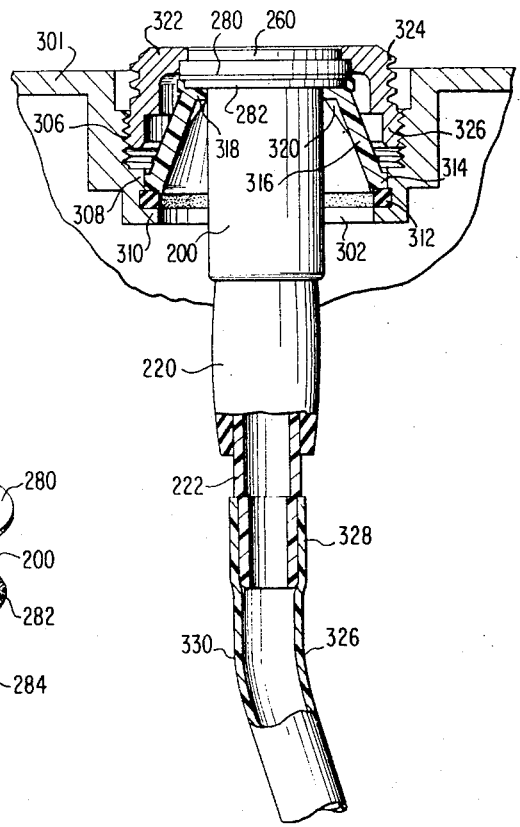
FIGURE 5 shows a slightly modified embodiment of the adapter B of the present invention incorporated in a so-called "golden gate" type beer keg, modified portions of the adapter being shown in cross section for the sake of clarity.
Figure 6:
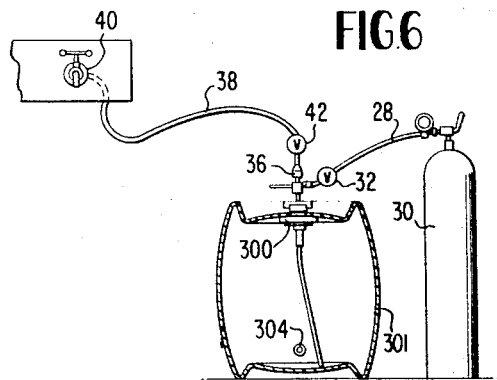
FIGURE 6 is a schematic diagram similar to that of FIGURE 1 for a "golden gate" system.

In this system, the top of the keg is provided with a cavity generally illustrated at 300 in FIGURE 6 which is provided with a much larger opening 302 (FIGURE 5). The "golden gate" keg 301 is also provided with a beer outlet 304 adjacent its lower end. When the so-called "golden gate" keg 301 is used with the tapping device of the present invention the outlet aperture 304 is closed off and not used. The beer outlet as well as the gas inlet is through the enlarged upper opening 302 of FIGURE 5.

Referring to FIGURE 5, the standard "golden gate" beer keg has an enlarged (1½ inch diameter) opening 302 in its top wall. It is provided with internal threads at 306, a first shoulder 308 and a second spaced annular shoulder 310. A 1½ inch internal diameter annular sealing ring 312 is seated on the shoulder 310 of the keg opening and is held in place by the lower flange 314 of a plastic skirt 316. The skirt is formed generally in the shape of a truncated cone and when assembled the flange 314 bears tightly against the ring 312 thereby forming a liquid and gas-tight seal between the skirt and the keg. The upper end of the skirt is also provided with a flange 318 suitably stiffened by vanes 320 which engage the sealing ring 282 to provide an air and gas-tight seal at this point between the skirt and adapter proper. The entire unit is held in place and pressure applied to the sealing rings by means of a brass ring 322 externally threaded at two places, namely 324 and 326. Threads 326 engage with the internal threads 306 on the keg to tightly clamp the entire unit in place. Threads 324 are provided to engage with a probe collar such as the collar 118 of FIGURES 1–3. Operation of the unit is otherwise identical to that previously described in conjunction with the embodiments of FIGURES 1–4.

As previously mentioned, the keg adapter unit may be used with either a polyethylene or Lexan type plastic siphon tube. In the embodiment illustrated in FIGURES 1–4, the keg adapter is shown for use with a flexible polyethylene siphon tube 228 which flexes so that any probe pushed into the barrel through aperture 27 for cleaning or the like will not damage the siphon tube and simply brushes it aside. However, because of the difficulty in attaching polyethylene to other materials, the keg adapter B in the embodiment illustrated in FIGURES 1–4, provides the sealing ring 224 and ferrule 226 which aid in tightly sealing the polyethylene tube 228 to the remainder of the adapter system.

FIGURE 5, on the other hand, illustrates a rigid plastic and preferably Lexan type siphon tube 326 which is preferably welded as at 328 directly to the bottom of center tube 222. The rigid siphon tube 226 is provided with a shallow elbow 330 so that it clears any cleaning probe pushed into the barrel through the lower aperture such as the cleaning aperture 27 of FIGURE 1 in the "peerless" type keg or the outlet aperture 304 shown in the "golden gate" type keg in FIGURE 6 which likewise may be used for cleaning purposes. Again, the bottom end of the siphon tube is preferably notched or if desired, may be connected to a suitable strainer so that beer at the bottom of the keg may gain entrance to the interior of the siphon tube and pass out through the tapping device.

In the preferred embodiment, the Serria valve 220 is preferably made of a gum or surgical rubber. However, in some instances silicone rubber may be used, since there is no chance of silicone rubber ever giving off any undesired odor. However, the gum rubber has a better memory and is preferred especially for series connected systems. When silicone rubber is utilized, the slits are preferably smaller but more numerous so as to minimize the possibility of the rubber material lipping over. This has not been found to be a problem with the gum or surgical rubber.

It is apparent from the above, that the present invention provides an improved tapping device for withdrawing beer or similar liquids from beer kegs and like containers. An important feature of the present invention is the provision of an increased gas flow path through a system suitable for use in the restricted aperture available in the most common "peerless" type draft beer systems. This is particularly made possible by the provision of a novel slotted T-section and enclosing sleeve, both of which elements may be readily and economically molded from suitable plastic materials such as Lexan. Other important features of the invention include a novel attachment whereby the same system is readily adapted for use in a "golden gate" keg as well as a "peerless" system. In addition, the tapping device of the present invention provides a novel arrangement for using flexible type siphon tube materials such as polyethylene which are difficult to weld, glue or otherwise connect to other materials. Furthermore, the novel sleeve along with the slotted T-section and center tube of the present invention provide apparatus for tightly clamping and sealing the Serria valve in conjunction with a sealing gasket and ferrule for attaching a polyethylene siphon tube to the system. A more simplified connection is illustrated in the embodiment of FIGURE 5 utilizing a rigid tube with a bend or elbow to provide cleaning aperture clearance. In the case of a rigid tube made from plastic material such as Lexan, similar to the center tube of the keg adapter, the two tubes may be directly welded together to provide a simple tight, and reliable fluid and gas-tight coupling between the two elements.

The improved gas pressure tapping device, utilizing in particular an improved keg adapter unit, at all times keeps the keg sealed, is semi-permanently connected to the conventional dispensing apparatus at a tavern or restaurant and yet can be readily and easily attached and removed by the bartender. The increased liquid and particularly gas passageways are provided while keeping within the ¾ inch under diameter limitation dictated by the size of beer openings in the "peerless" beer kegs. The improved keg adapter unit has a relatively large, non-tortuous, unobstructed liquid passageway through which the beer is withdrawn from the keg with a minimum of expansion and contraction, thereby substantially obviating the problem of beer becoming "wild" or "flat" during withdrawal and making the invention universally usable with low and high pressure beer systems. Moreover, the improved keg adapter units of this invention also include an enlarged gas passageway which is completely segregated from the liquid passage therein with the beer positively prevented from entering any part of the gas passageway from within the keg to prevent contamination of the beer. The keg adapter units include means for securing the units within the beer openings of conventional beer kegs (both "peerless" and "golden gate"), without modifications in the openings of the beer kegs and without any substantial modification of the adapter units themselves. The improved adapter units are universally usable with the coupler units particularly shown and described in copending application Ser. No. 587,627, and can be quickly and easily attached to these coupler units to permit tapping of the beer kegs without the economic loss of beer heretofore occasioned in tapping beer kegs using prior tapping devices. The arrangement of the device is such that all elements may be easily maintained and cleaned and can be manufactured competitively with many of the parts molded from suitable rigid plastic.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tapping device or siphon for a keg or like container for liquids such as beer which has a top, bottom and side walls with an opening in one wall of said keg, characterized in that it comprises: a keg adapter unit including a central body adapted to be secured within a keg opening, with a liquid passage extending through said main body to permit transfer of liquid from the inside to the outside of a keg; normally closed liquid valve means in said liquid passage, including a seat having an opening therethrough, and a valve member having a bifurcated stem extending through said opening in said seat, with resilient means normally biasing part of said valve member into sealing engagement with said seat; an intermediate member surrounding said central body and having slots completely through its walls defining a plurality of gas passageways around said central body, a solid sleeve surrounding said central body, a short section of plastic tubing welded to the lower end of said central body, a rubber gas valve having slits therein for permitting flow of gas toward the inside of the keg and preventing flow of liquid from the keg into said gas passageways, the upper end of said gas valve being clamped between said intermediate member and said sleeve, the lower end of said gas valve engaging said short section of plastic tubing, means for securing said central body in said opening of a keg with a seal therebetween; a coupler and dispensing unit including a head member having a probe extending therefrom, with a liquid passage extending through said probe and coupler head; a gas passage in said coupler head bypassing said liquid passage in the coupler head, and means for securing said coupler and dispensing unit to said adapter unit with said probe extending into a portion of the liquid passage in said keg adapter unit and depressing said bifurcated stem of the liquid valve member to open said normally closed liquid valve means.

2. A liquid dispensing apparatus adapted for use with a keg or like container for liquids which has a top, bottom, and side walls with an opening in one wall of said keg, characterized in that it comprises a keg adapter unit including: a central body adapted to be secured within the keg wall opening and having a liquid passage extending through said body to permit transfer of liquid from the inside to the outside of a keg; normally closed liquid valve means in said liquid passage including a seat having an opening therethrough, and a valve member having a bifurcated stem extending through said opening in said seat; with resilient means normally biasing part of said valve member into sealing engagement with said seat, an intermediate member surrounding said central body and having slots completely through its walls defining a plurality of gas passageways around said central body, a solid sleeve surrounding said intermediate member, a siphon tube coupled with said liquid passage; and a slit annular gas valve having a portion thereof surrounding the lower end of said intermediate member and another portion extending around said central member, said valve permitting flow of gas toward the inside of the keg and preventing flow of liquid from the keg into said gas passageways; said central body including a short section of plastic tubing sealed to its lower end, said siphon tube being connected to said short section of plastic tubing and being made of flexible polyethylene; a gasket between said short section of plastic tubing and said siphon tube, and a plastic ferrule welded to said short section of tubing and surrounding said gasket.

3. A liquid dispensing apparatus adapted for use with a keg or like container for liquids which has a top, bottom and side walls with an opening in one wall of said keg characterized in that it comprises: a keg adapter comprising a central body adapted to be secured within the keg wall opening and having a liquid passage extending through said body in the direction of the longitudinal axis of said body for transfer of liquid from the inside to the outside of a keg; normally closed liquid valve means in said liquid passage, with means for retaining said liquid valve means within said body, a solid sleeve surrounding said body to provide a separate gas passage through said adapter between said sleeve and body, a resilient gas check valve surrounding a portion of said body and communicating with said gas passageway, said valve having a thickened ring portion, and means on said body for clamping said thickened ring portion of said resilient gas check valve to said sleeve.

4. Apparatus according to claim 3 wherein said ring is adjacent the upper end of said gas check valve, said gas passageway communicating with the annular space between said ring and said body.

5. Apparatus according to claim 4 including tubular plastic extension means on the lower end of said body, the lower end of said gas check valve resiliently engaging said extension means.

6. Apparatus according to claim 5 wherein said extension means includes a plastic tube telescopingly receiving the upper end of a siphon tube.

7. Apparatus according to claim 6 wherein said siphon tube is made of polycarbonate.

8. A liquid dispensing apparatus adapted for use with a keg or like container for liquids which has a top, bottom and side walls with an opening in one wall of said keg characterized in that it comprises: a keg adapter comprising a central body adapted to be secured within the keg wall opening and having a liquid passage extending through said body in the direction of the longitudinal axis of said body for transfer of liquid from the inside to the outside of the keg; normally closed liquid valve means in said liquid passage, with means for retaining said liquid valve means within said body; an intermediate member surrounding said central body and having a plurality of gas passageways therethrough, a plurality of posts on said intermediate member engaging said valve body is spaced relation whereby gas may flow between said posts, a valve retainer attached to said intermediate member and urging said valve body against said posts, a solid sleeve surrounding said intermediate member, and gas valve means associated with said gas passageways for permitting the flow of gas toward the inside of a keg and preventing flow of liquid from the keg into said gas passageways.

9. A liquid dispensing apparatus as described in claim 8 further including a hollow siphon tube coupled to said adapter and communicating with the lower end of said central body, said siphon tube being made of rigid polycarbonate and including a shallow bend intermediate its ends.

10. A liquid dispensing apparatus adapted for use with a keg or like container for liquids which has a top, bottom and sidewalls with an opening in one wall of said keg characterized in that it comprises a keg adapter unit including: a central body adapted to be secured within the keg wall opening and having a liquid passage extending through said body to permit transfer of liquid from the inside to the outside of a keg; normally closed liquid valve means in said liquid passage, including a seat having an opening therethrough, and a valve member having a bifurcated stem extending through said opening in said seat; with resilient means normally biasing part of said valve member into sealing engagement with said seat, an intermediate member surrounding said central body and having slots completely through its walls defining a plurality of gas passageways around said central body, a plurality of posts on said intermediate member engaging said valve body in spaced relation whereby gas may flow between said posts, a valve retainer threadedly attached to said intermediate member and urging said valve body against said posts, a solid sleeve surrounding said intermediate member, a siphon tube coupled with said liquid passage; and a slit annular gas valve having a portion thereof surrounding the lower end of said intermediate member and another portion extending around said central body, said valve permitting the flow of gas toward the inside of the keg and preventing flow of liquid from the keg into said gas passageways.

References Cited

UNITED STATES PATENTS

| | | | |
|---|---|---|---|
| 3,357,602 | 12/1967 | Sichler | 222—400.7 |
| 3,361,152 | 1/1968 | Akers | 222—400.7 X |
| 3,156,252 | 11/1964 | Johnston | 222—400.7 X |
| 3,173,586 | 3/1965 | Pawsor | 222—400.7 |

ROBERT B. REEVES, *Primary Examiner.*

NORMAN L. STACK, JR., *Assistant Examiner.*

U.S. Cl. X.R.

222—402.16

PO-1050
(5/69)

UNITED STATES PATENT OFFICE
CERTIFICATE OF CORRECTION

Patent No. 3,438,553    Dated April 15, 1969

Inventor(s) MACK S. JOHNSTON

It is certified that error appears in the above-identified patent and that said Letters Patent are hereby corrected as shown below:

Column 1, line 55, "it" should read -- is --; line 71, "and siphon device from the keg, removes the" should read -- rod into the keg to drive the beer up through the --. Column 2, line 69, after "in" delete "the" and insert -- and --. Column 5, line 14, "as" should read -- at --.

SIGNED AND
SEALED
JAN 27 1970

(SEAL)
Attest:

Edward M. Fletcher, Jr.
Attesting Officer

WILLIAM E. SCHUYLER, JR.
Commissioner of Patents